United States Patent [19]

Arai

[11] Patent Number: 5,062,786

[45] Date of Patent: Nov. 5, 1991

[54] MOLDING DEVICE FOR MOLDING OPTICAL ELEMENTS

[75] Inventor: Takashi Arai, Yokohama, Japan

[73] Assignee: Canon Kabushiki Kaisha, Tokyo, Japan

[21] Appl. No.: 448,544

[22] Filed: Dec. 11, 1989

[30] Foreign Application Priority Data

| Dec. 12, 1988 | [JP] | Japan | 63-314512 |
| Dec. 16, 1988 | [JP] | Japan | 63-317698 |
| Jul. 4, 1989 | [JP] | Japan | 1-171219 |
| Jul. 7, 1989 | [JP] | Japan | 1-174120 |
| Jul. 10, 1989 | [JP] | Japan | 1-175579 |

[51] Int. Cl.$^5$ .............................. B29C 45/73
[52] U.S. Cl. ..................... 425/174; 264/25; 425/174.4; 425/174.8 R; 425/174.8 E
[58] Field of Search ............... 264/25; 425/174, 174.4, 425/174.6, 174.8 R, 174.8 E; 156/73.1, 272.2, 272.6

[56] References Cited

U.S. PATENT DOCUMENTS

| 4,340,551 | 7/1982 | Wada et al. | 264/25 |
| 4,771,153 | 9/1988 | Fukushima et al. | 264/25 |

FOREIGN PATENT DOCUMENTS

| 45039 | 4/1975 | Japan. |
| 40504 | 9/1983 | Japan. |

Primary Examiner—Timothy Heitbrink
Attorney, Agent, or Firm—Fitzpatrick, Cella, Harper & Scinto

[57] ABSTRACT

A molding device a molding machine with both fixed and movable side molds and which has cavities for molding a product. An injection cylinder injects resin into the cavities and a mold driving control performs the opening and closing operations of the molds. During the molding cycle, the cavities are heated by a high frequency heating system consisting of a coil, oscillation control section for inducing high frequency oscillation to the coil during the opening of the mold and stopping the high frequency oscillation during the closing of the molds. A mold temperature detector having a temperature sensor measures the temperatures of the molds and a temperature control initiates the circulating of a cooling medium within a circulating pathway which is provided within the molds.

4 Claims, 15 Drawing Sheets

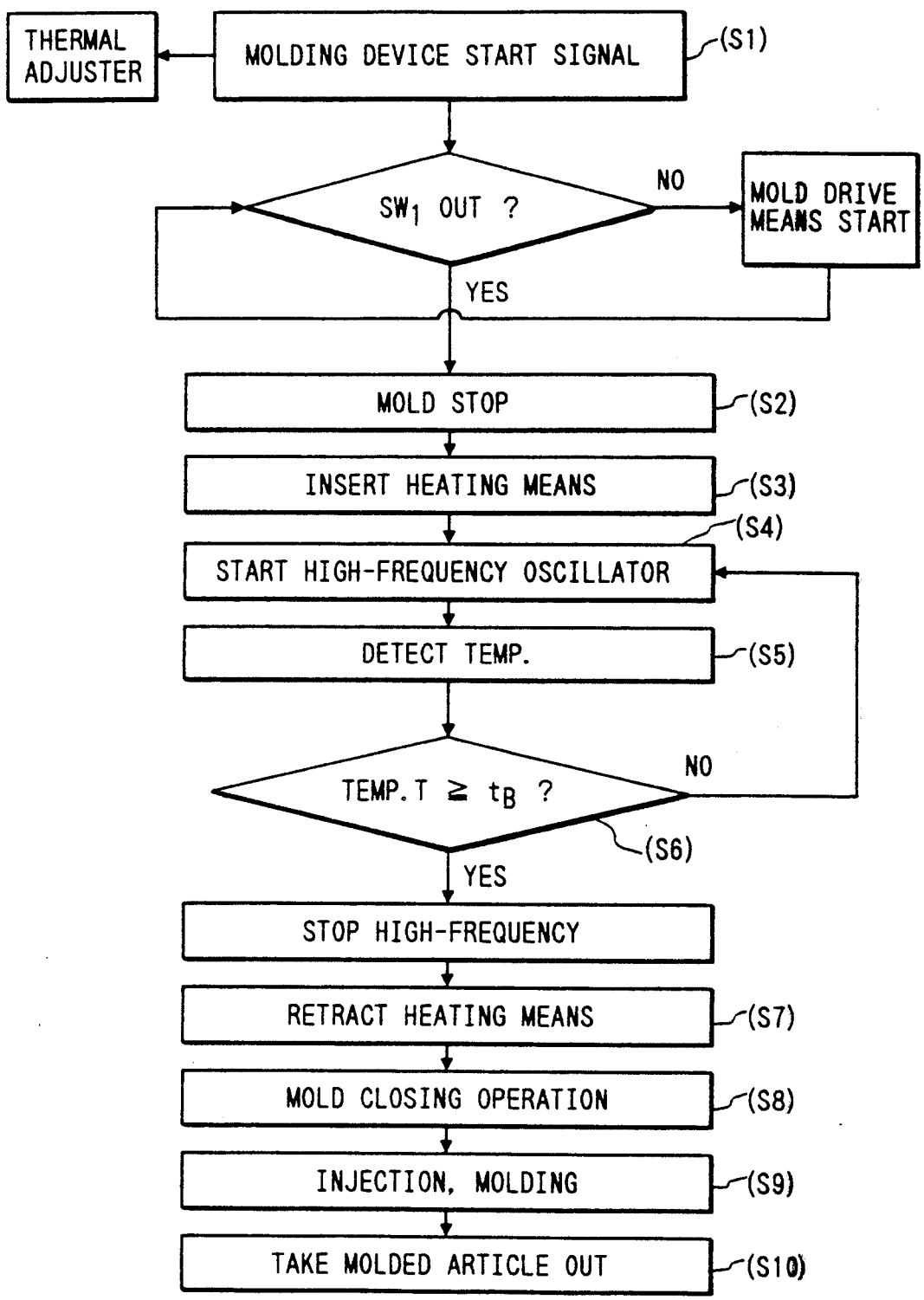

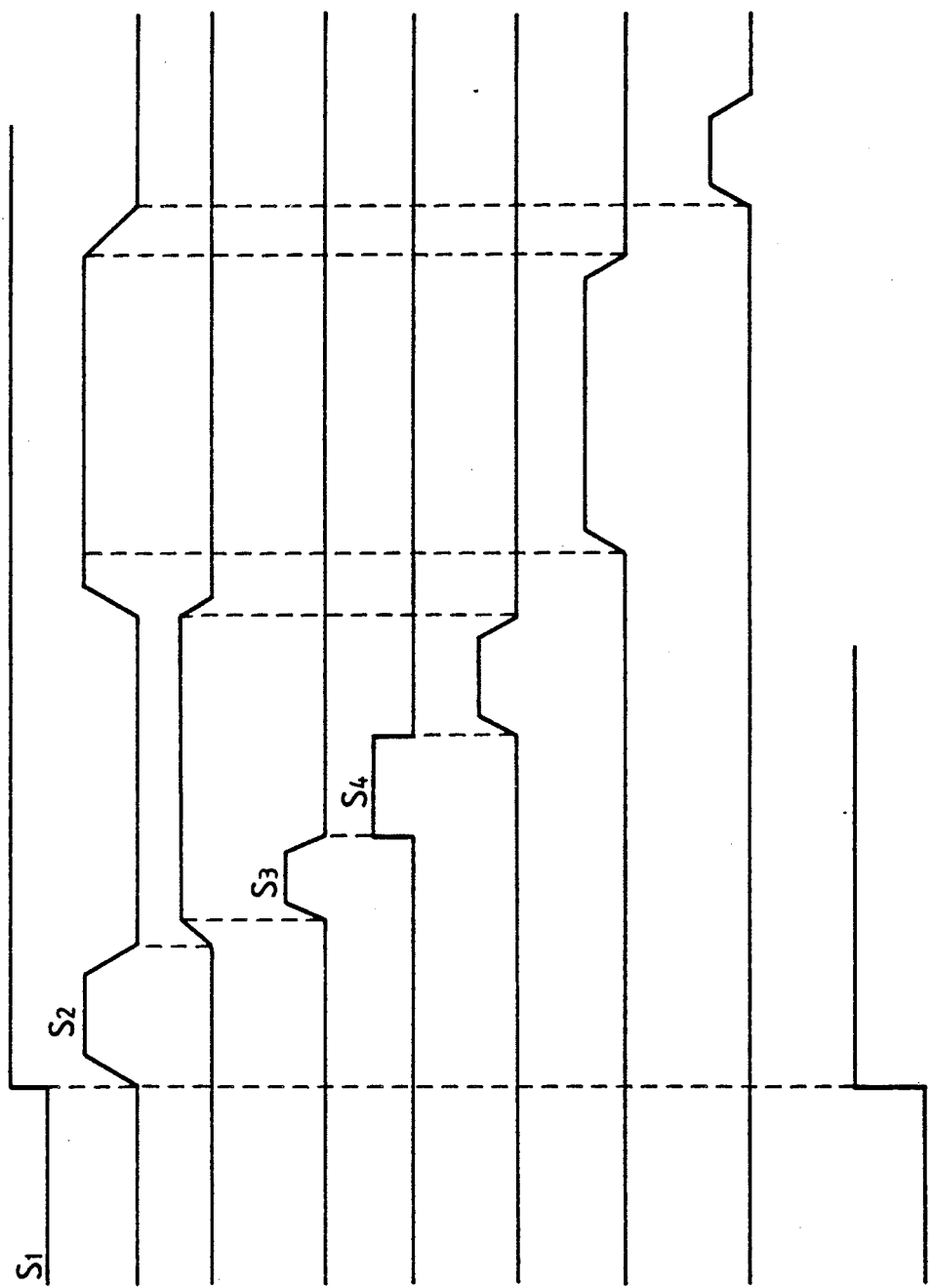

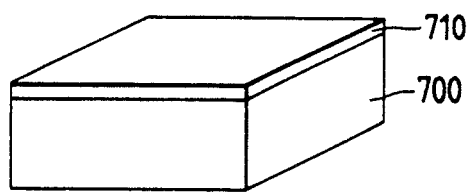
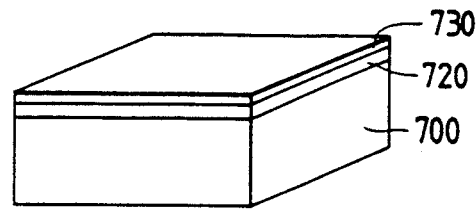
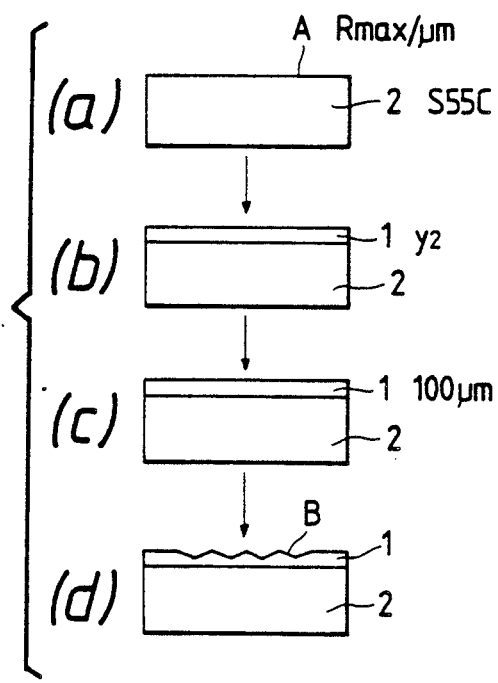
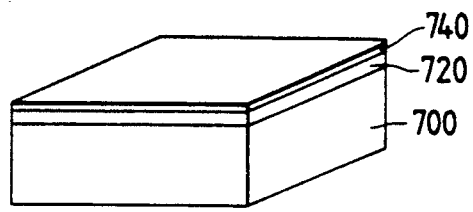
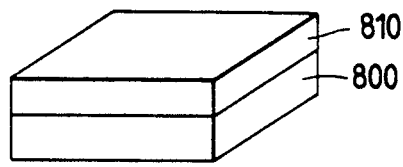

MOLDING DEVICE FOR MOLDING OPTICAL ELEMENTS

BACKGROUND OF THE INVENTION

1. Field of the Invention

The present invention relates to a molding method suitable for molding optical element, lens or the like.

2. Related Background Art

In the prior art, a process for injection molding by heating the mold by high frequency heating has been proposed as described in Japanese Laid-Open Patent Application No. 50-45039. The process comprises using a device having oscillation electrodes and cooling water pathway in a mold and having an external oscillator and cooling pump, heating the mold momentarily during filling of resin by means of the oscillating electrodes provided in the mold, and after completion of filling, stopping oscillation, flowing cooling water through the mold by the cooling water pump to cool and solidifying the resin.

Also, Japanese Patent Publications No. 58-40504 and U.S. Pat. No. 4,340,551 propose an injection molding process, which performs injection molding of a thermoplastic resin by prior heating of the mold surface on which the injection molded product surface is to be formed by means of high frequency induction heating before to a temperature not lower than the heating deformation temperature of the thermoplastic resin.

SUMMARY OF THE INVENTION

A problem in the case of injection molding a molded product by high frequency heating as described above in the prior art is the difficulty of temperature control of the mold. By providing an inductor for high frequency induction heating in the middle between the fixed side mold and the moving side mold, oscillating high frequency with the inductor sandwiched between the fixed side mold and the moving side mold, while no mold cooling water is permitted through the mold, the mold can be heated to a desired temperature efficiently within a short time. However, after heating to a desired temperature, in a series of molding cycles of mold opening of mold for inductor retreating, mold closing, injection of an injection material, pressure molding, cooling, mold release of molded product, it is difficult to control the temperatures of the mold to the temperatures demanded for the respective steps. This is because, after heating of the mold by high frequency induction heating, the mold is abruptly cooled by heat released by the mold opening and subsequently cooled by the cooling step after the molding step, making control of the mold temperature very difficult.

When the shape of the molded product is complicated, or the molded product requires a high precision of surface roughness, the problems mentioned above are critical.

For example, when an optical part such as lens, etc. is prepared by injection molding, the surface roughness preciseness of the molding cavity of mold is required and temperature control of the mold is particularly important.

The mold temperature immediately before injection greatly affects flow property of injection material, both injection material is distributed by flowing to all the corners throughout the cavity of the mold. Thus, when during solidification along the shape of molded product of injection material, the mold is cooled by cooling means, sinking of molded product or strain of molded product occurs if progress of solidification of the molded product is not matched to the cooling temperature of mold.

Although these problems will cause no particular difficulty when the thickness dimension of the molded product is relatively thick or when the function required for the molded product is not for optical part.

The present invention proposes an injection molding process which heats molds by high frequency induction in injection molding of an optical part such as lens for camera, Fresnel lens, etc. and also accurately performs management control of mold temperature to completion of the molding cycle without occurrence of sinking, or strain of the optical part, as mentioned above.

In the case of injection molding of, for example, Fresnel lens 100 as shown in FIG. 6 as the optical part, the tip portion 100B of the apex angle portion 100A having a curvature is required to form a certain sharp angle on the incident side of the image forming light. In the technique of the prior art, as described above, during the process when form solidification of the injected material progresses in injection molding, sinking or strain of the resin of molded product is generated, whereby the sharp angle of the above-mentioned tip collapses. Thus, no molded product such as Fresnel lens, etc. with high precision is obtained. The present invention proposes a molding process which enables temperature control of the cavity surface having precise and fine uneven surface provided on the cavity surface of mold for a Fresnel lens as described above.

ii) Further, the present invention proposes a molding device which heats the mold cavity of mold, formed by opening, by high frequency induction heating within a short period of time and can also maintain the molding temperature optimally in the injection step after mold closing.

iii) Further, the present invention proposes a device for efficiently heating [onto] the cavity used in the above molding process. For promoting efficiency of heating as mentioned above, the present invention proposes a position control means for positioning the heating means constantly at the optimum position for heating the cavity of molds formed by opening. Also, the present invention proposes a device in which stability of heating actuation and prevention of that release of the heated mold can be effected by performing heating with a structure of the heating means during opening of molds, being maintained at the predetermined position by the position control means as described above and the control means after completion of heating treatment.

iv) The molding device by means of the high frequency induction heating system according to the present invention, in order to uniformly heat the whole mold surface, has the heating coil shape similar to the mold surface shape opposed to the coil and maintains the air gap between the mold surface and the coil during high frequency oscillation, thereby making the eddy current generated on the mold surface constant to uniformize the Joule's heat generated by the eddy current.

For this reason, when the mold surface has a slide structure such as outer slide, inner diameter slide and slide for thrusting molded produce, etc., or the mold is constituted of a combination of parts, current is concentrated at the slide sliding portion and the part combination portion to effect spark discharging, whereby there occur in seize of the mold, and dragging during slide movement.

Accordingly, when there is the slide portion or the part combination portion in a part of the mold, concentration phenomenons caused by concentration of eddy current due to incomplete adhesion mutually between the molds at the clearance portion or the fitting portion could not be avoided.

The present invention has been accomplished in view of the problems of the prior art as mentioned above, and provides a process which can perform stable heating treatment without causing discharging by concentration of eddy current to occur and providing a high frequency heating coil having a novel structure.

v) Japanese Laid-open Patent Application No. 58-40504 proposes a process for injection molding of a thermoplastic resin, which comprises prior heating of the mold surface in contact with the injection molded product to not lower than the thermal deformation temperature of the thermoplastic resin by means of the high frequency induction heating system.

As the mold for injection molding according to such high frequency induction heating system, there have been used those formed by casting, roll working or heat treatment, followed by cutting working, finishing assembling working or rolled steal material (SS), carbon steel for mechanical construction (SS, SCK), too, steel (SK, SKS), high speed steel (SNC), chromium molybdenum steel, etc.

Particularly, the iron type mold material, as described above, is suitable for the mold according to the high frequency induction heating system as described above.

Optical parts, for example, lenses, Fresnel lenses, etc. are required to have extremely high precision in finishing precision of the surface, and in the shape precision of the lens curvature. In the case of lens, the molten resin injected into the mold cavity, after completion of injection, undergoes cooling solidification by cooling of the mold, thereby forming a lens shape. At this time, if the control of cooling temperature of the mold is not adequate, sinking of the lens surface occurs and the shape of the lens curvature cannot be formed as desired.

Also in the case of Fresnel lens shown in FIG. 2, if the temperature control of mold is not conducted adequately, molding of the sharp angle portion at the tip of the apex angle portion 100 Å cannot be done as desired.

When heating of the mold is performed according to the high frequency induction heating system, heating operation of the mold can be brought to a high temperature within a short time. By use of the abovementioned iron type a metal material as the mold material, heating can be efficiently effected.

However, iron metal materials, particularly steel type materials frequently used in these days have drawbacks in cutting moldability. More specifically, because they are super-hard materials, it is difficult to create a curved surface by cutting working and maintaining surface roughness in high precision of the cavity face, or to form Fresnel shape on the cavity face. Particularly in the case of Fresnel lens, forming an uneven portion of 4 um order is very difficult.

For formation of fine uneven shape onto the cavity face, a mold material with good workability, e.g. copper type or aluminum type materials, is preferable. However, since these materials are nonmagnetic and low in electrical resistance, the high frequency induction heating system as described above cannot be adopted for heating of the mold. Also, defects such as pinholes, etc. are liable to be formed during mirror working. Thus, they are unsuitable as mold material.

The present invention is intended to provided a mold which can be cut worked in fine unevenness shape on the cavity surface, and also can be heated according to the high frequency induction heating system by which the molded resin injected into the cavity can be injected into fine uneven portions within the cavity with ease.

Also, the present invention is intended to provide a mold which improves the mirror working precision of the mold surface and is substantially free from pinholes, etc. for molding of an optical part such as lens Fresnel lens for which extremely high precision is demanded for surface roughness precision.

(vi) Further, the present invention proposes a novel temperature measuring means of a molding machine unit provided with a heating means which progresses into a space between the fixed side mold and the movable side mold and maintains the distance between the heating coil of the heating means and the cavity at a constant object.

In conformity with the above-mentioned object, there is proposed a structure in which a temperature sensor moves corresponding to the cavity core moving progressively or retroactively relative to the mold plate.

BRIEF DESCRIPTION OF THE DRAWINGS

FIG. 1B is a flow chart diagram of the above molding device.

FIG. 3 is the timing chart diagram of the respective constitutioning units of the device in FIG. 1.

FIG. 18 showing a schematic sectional view of the constitution of mold member heating treatment by use of the coil of the present invention, FIG. 19A showing a schematic sectional view of the coil shown in FIG. 18, FIG. 19B a diagram showing the relationship between the coil shown in FIG. 19A and the coil moving means, FIG. 19C a side view of FIG. 19B, FIG. 20 a surface temperature diagram of the mold member shown in FIG. 18, FIG. 21 and FIG. 22 respectively schematic plan view and schematic side view showing another example.

FIGS. 23 to 24 (a), (b), (c), (d) show the first example, FIG. 23 showing constitutional illustration of the mold, and FIGS. 24 (a), (b), (c), (d) showing the mold preparation steps.

FIG. 25 is a constitutional illustration of the mold of the second example.

FIG. 26 is a constitutional illustration of the mold of the third example.

FIG. 27 is a constitutional illustration of the mold of the fourth example.

DETAILED DESCRIPTION OF PREFERRED EMBODIMENTS

Figure 1A:
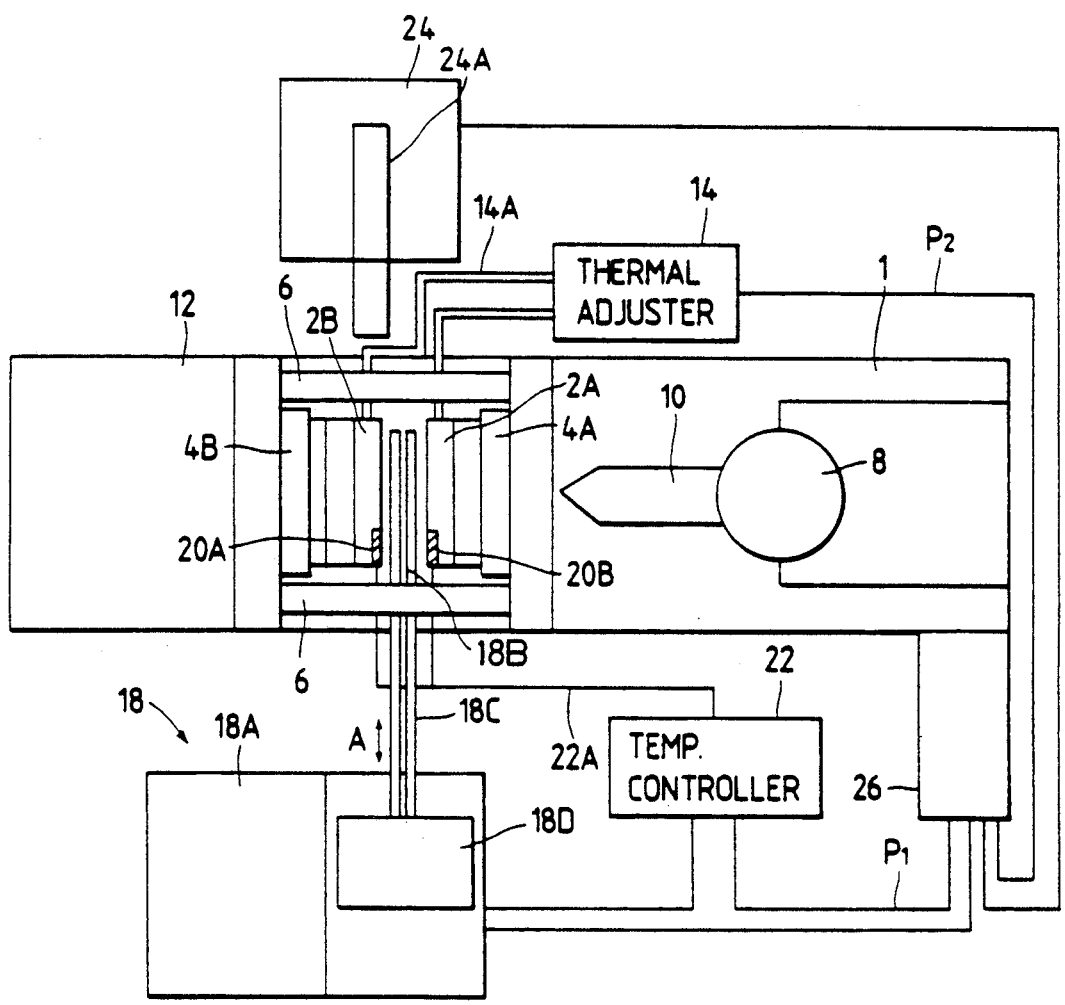
FIG. 1A is a constitutional diagram of the molding device for practicing the molding process of the present invention.
Figure 2:
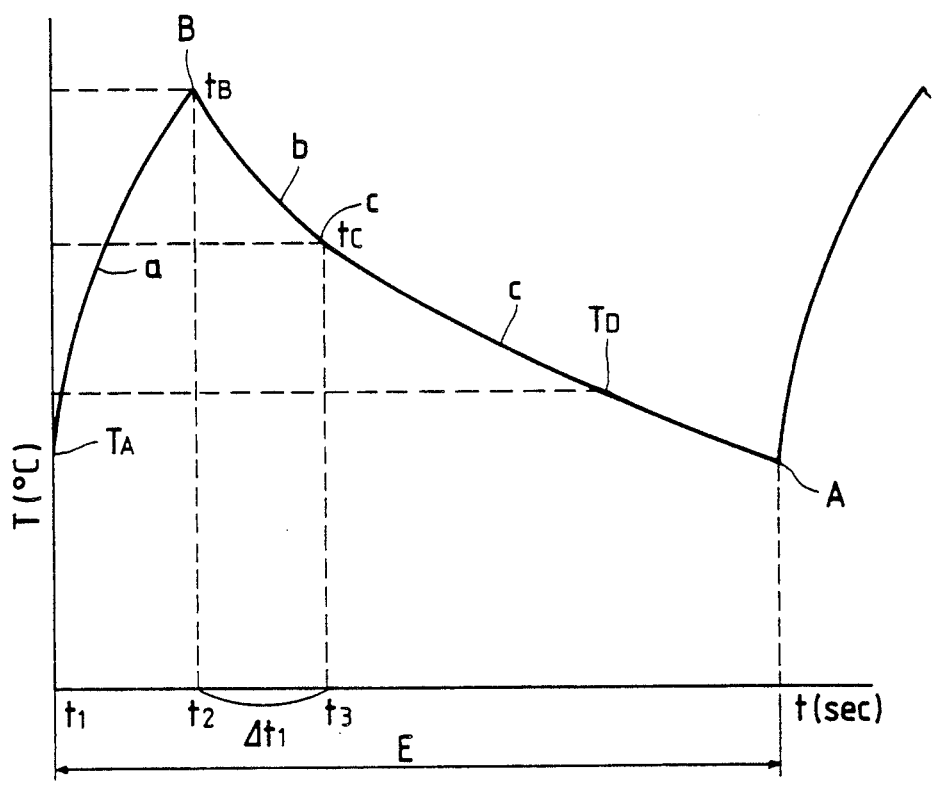
FIG. 2 is the temperature curve of the mold in the molding according to the present invention.

FIG. 1A is a constitutional diagram of an injection molding device for illustration of embodiments of the present invention, FIG. 2 is a temperature curve graph of the mold and FIG. 3 is a timing chart diagram of each unit constituting the above device.

1) In the Figure, the symbol 1 shows the main body of an injection molding machine, and the main body is constituted of a fixed side mold 2A and a moving side mold 2B having a cavity for forming a molded product (not shown), mold plates 4A, 4B, moving guide members 6, 6 for supporting the molds as mentioned above, a hopper 8, an injection cylinder 10 and a driving means 12 for performing opening and closing of the above molds and die opening and closing, etc. The structures of the fixed side and moving side molds are described in detail below by referring to FIG. and FIGS. 16A and 16B.

14 is a temperature controller for controlling the temperature of molds, which controller 14 is connected through a pipe 14A to a cooling medium pathway (not shown) within the molds 2A, 2B so as to circulate the cooling medium with a pump (not shown).

18 shown a high frequency induction heating means, which means is constituted of a high frequency induction controlling section 18A and a coil section 18B, and a supporting member 18C supporting the coil section 18B, and also a moving means 18D for progressing and retreating the supporting member in the arrowhead direction shown A.

20A and 20B and temperature detecting sensors, which sensors are embedded at appropriate positions in the above molds so as to output detection signals by detection of the temperature at the cavity face of the above molds, and the detection signals are inputted through the lead wire 22A into the temperature detecting means 22.

24 shows a means for taking out molded product, which means 24 takes out the molded product with an autohand 24A.

26 is a controller for controlling the molding device as a whole.

FIG. 1B is an actuation flow chart diagram of the molding device shown in FIG. 1A. The operations of the device shown in FIG. 1A are described on the basis of FIG. 1B, FIG. 2 and FIG. 3. By the molding initiation operation (step $S_1$) (not shown) of the controller 26, the moving side mold 2B existing at the position of initial mold opening begins to move toward the direction of closing the molds, and when the moving side mold 2B comes to the first position to maintain a predetermined distance from the fixed side mold 2A, the moving side mold 2B stops moving. The amount of movement of the moving side mold 2B is detected by the first position detecting means (switch) $SW_1$, of which signal is inputted into the controller 26, and the mold 2B stops at the stop signal from the mold driving means 12 based on this signal (step $S_2$).

When the moving side mold 2B stops at the first position, the signal $P_1$ for controlling the high frequency induction heating means 16 is outputted from the controller 26.

By the signal $P_1$ the heating means 18B retreated outside of the opening and closing movement zone of the molds 2A and 2B progresses into between the moving side mold 2B and the fixed side mold 2A with the moving means 18D (step $S_3$). The heating coil 18D will stop when it comes to a position which is a position opposed to the cavity face (not shown) of the mold and a preferably position for heating the cavity face. With stopping of the heating coil 18B, high frequency oscillation (step $S_4$), whereby high frequency oscillation is transmitted to the heating coil 18B, and the molds 2A and 2B are heated by known high frequency induction heating actuation to be elevated in temperature as shown in FIG. 2 along the curve a from the temperature of $t_A$ at the oscillation initiation point $t_1$ toward the peak temperature $t_B$. From the controlling section 26, the temperature controller section 26, the temperature controller 14 is actuated to actuate the signal $P_2$, and the temperature controller 14 is actuated at the initial operation of the molding initiation operation of the above controlling section. The temperature controller 14 controls the temperature of the cooling medium in a reservoir (not shown) to a predetermined temperature, and at the same time circulates the cooling medium into the fixed side mold and the moving side mold through the pathway 14A actuation of a pump (not shown). While the cooling medium is circulated within the molds, the cavity of the mold is elevated in temperature by the high frequency induction oscillation with the heating coil 16B rapidly up to peak temperature $t_B$ shown in FIG. 2. The temperatures of the molds are detected by the sensors 20A and 20B provided in the respective molds, and the detected signals are inputted in the temperature detecting means 22 (step $S_5$).

The temperature detecting means 22 sends oscillation stop signals to the high frequency oscillation control section 16A on detection of the peak temperature $t_B$ described above.

The detecting operation by the sensors 20A, 20B is repeated until the temperature becomes T≧temperature peak $t_B$ (step $S_6$).

On confirmation of the temperature having reached the peak temperature, command for retreating the heating means 18B is sent to the moving means 18D from the controller 26 (step $S_7$).

When the heating means 18B is retreated from the moving side, mold 2B is closed by the mold driving means 12 simultaneously with completion of retreating to effect mold closing operation (step $S_8$).

By completion of mold closing operation, injection preparations of the mold are completed, and there is the lapse of time $\Delta t_1$ from the time $t_2$ to the time $t_3$ from the heating stop by the oscillation stop of the heating coil to completion of the mold closing operation as described above. During the elapsed time $\Delta t_1$, a temperature fall of $(t_B - t_C)$ occurs in the mold. However, by momentary heating through high frequency induction heating, which is one specific feature of the present invention, and the cooling operation with a cooling medium during the heating, the temperature drop curve b from the peak temperature $t_B$ to the injection temperature to is always constant, and the temperature of the injection $t_C$ is always constant even if the injection molding cycles may be repeated for any cycles.

From the controlling section 26, the injection cylinder 10 is actuated to inject the molten resin material in the hopper 8 through the gate (not shown) into the cavity of the molds. After a predetermined amount of the resin material is injected, the molds are cooled along the temperature curved C, whereby solidification of the molten resin in the cavity proceeds along the cavity shape to form a molded product (step S9).

Then, what the mold temperature drops to the temperature $t_D$ suitable for mold release, a mold opening signal is sent from the control section 26' to the mold driving means 12, whereby the moving side mold 2B moves. On completion of mold opening, the molded product take-out means 24 is actuated to take out the molded product with the autohand 24A to complete one cycle of molding (step S10).

Figure 6:
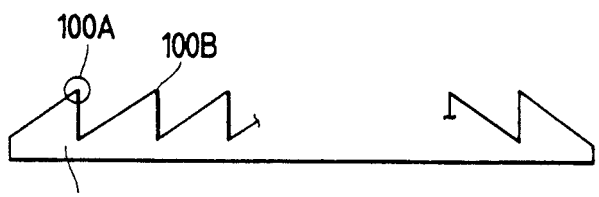
FIG. 6 illustrates the molding process of the present invention used for Fresnel lens.

In the case when the product obtained is Fresnel lens as shown in FIG. 6, it is required that the nolten resin injected into the cavity should be extended to all the corners throughout the cavity so that there is non void. For that purpose, it is necessary to promote flow property of the resin by setting the mold temperature at high level. At the same time, it is necessary to maintain the temperature curve in FIG. 2 at every cycle even though molding cycle may be repeated for any cycles. The present invention gives satisfactory results according to the molding process as described above.

Table 1 shows comparative data of the respective molding conditions of Example 1, Example 2 by use of the same mold, and the same device according to the molding method of the present invention and Comparative example by use of the prior art. In Table 1, Comparative example, as the result of oscillation operation at an output of 6.5 Kwatt at a frequency of 132 KHz and temperature measurement of molding of several cycles by a temperature sensor, gave rise to variation in measurement distribution at the respective temperatures of the respective molding cycles with peak temperatures $t_B = 182° - 215°$ C., injection temperatures $t_C = 110° - 142°$ C., mold opening temperatures $t_D = 65° - 94°$ C.

According to this Comparative example, since the actuation of the temperature controller 14 is switched OFF during the actuation time of the high frequency induction heating means 16, the temperatures of the cooling medium within the controller, within the cooling pathway and within the molds become nonuniform. This gives rise to variance in temperature of the molds due to the cooling action of the cooling medium because the temperature is not stabilized relative to the momentary high temperature of the molds by high frequency induction heating.

Example 1 and Example 2 show examples using a polycarbonate and a polymethyl methacrylate, respectively, and oscillation operation at outputs of 8.2 Kwatt, 6.5 Kwatt with a frequency of 132 KHz are performed, and the temperature controller 14 is actuated from the initial stage by the actuation signal from the molding controlling section to effect heating of the cooling medium with a heater and circulation of the cooling medium into the molds with a pump, thereby maintaining the cooling medium temperature at 80° C. and 50° C., respectively. The heating operation was conducted under the above conditions, the molds were heated to the peak temperatures $t_B = 244°$ C., 218° C. and temperature measurements performed from the sensor. As the result of temperature measurements by repeating several cycles of the mold temperatures $t_C$, $t_D$, the temperatures could be controlled to the peak temperatures $t_B = 244°$ C., 218° C., the molding temperatures during injection $t_C = 110°$ C., 80° C., and the mold opening temperatures $t_D = 160°$ C., 135° C. In the data as described above and shown in Table 1, in Examples according to the molding process of the present invention, the peak temperatures of the molds obtained by high frequency induction heating was constantly high even in the case of using the same material as comparative example. Also, the injection temperatures $t_C$ in Examples 1, 2 were constant (110° C., 80° C.), and further it could be confirmed that the curve of the temperature drop curve b from the peak temperature $t_B$ to the injection temperature $t_C$ always dropped along the same curve as shown in FIG. 2.

Figure 4A:
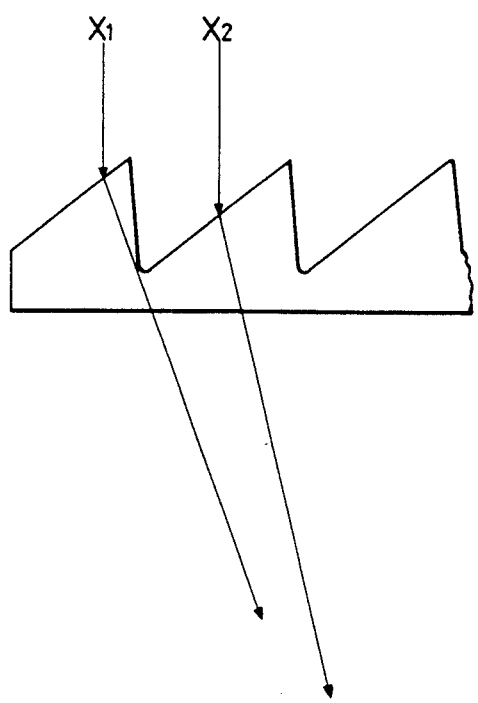
FIGS. 4A and 4B illustrate the molding precision of molded product.
Figure 4B:
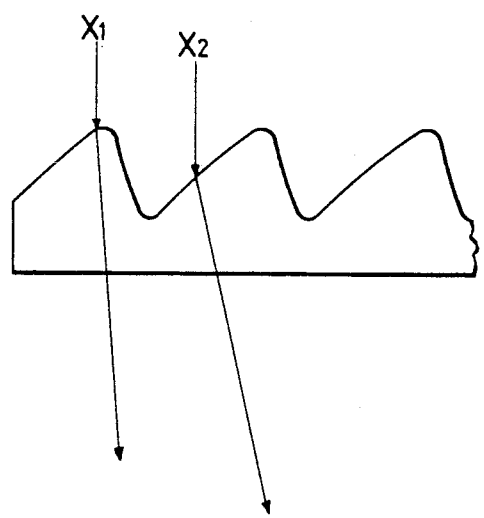

FIGS. 4A, 4B are schematic illustrations showing the molding results of the molded products according the molding process of the present invention and according to comparative examples as described above based on the data shown in Table 1.

The above molded products of FIGS. 4A, 4B show enlarged views of cross-sections of Fresnel lenses, FIG. 4B showing the molding process of the prior art, from which it can be clearly seen that the apex angle portion is blunted with the tip and being rounded. In contrast, FIG. 4A shows the molding process of the present invention, and the apex angle portion has accurately become a sharp angle with the tip end not being rounded. In the case of Fresnel lens, the incident light $X_1$, $X_2$, . . . are required to be refracted at the lens face and focused to one point on the optical axis. In Examples according to the present invention, as shown in FIG. 4A, the light incident on the apex angle portion can be accurately diffracted and the respective incident lights can be focused to one point, whereby no unfocused image called ghost will be formed in the image formed. In contrast, in the case of the prior art technique, as shown in FIG. 4B, the light incident on the apex angle portion, on account of blunting of the apex angle, becomes smaller in diffraction angle, and the incident lights cannot be focused at one point on the optical axis, whereby ghost is generated to give rise to unfocused image.

Figure 5:
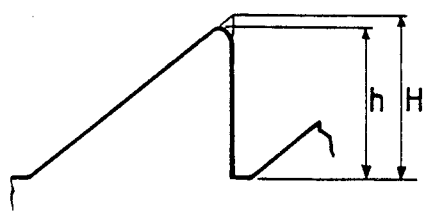
FIG. 5 illustrates molding precision measurement of molded product.

As a means for measuring the molding precision of Fresnel lens, there is a method shown in FIG. 5. The molding precision is higher when the ratio h/H of the height h practically obtained by molding relative to the height H which is the designating height from the bottom to the apex angle portion of the Fresnel lens is greater.

According to this method, while the ratio in the case of the prior art technique was about 60 to 80%, very high values of 98 to 99% could be obtained in the case of Examples 1 and 2 as described above.

2) Referring now to FIGS. 7 to 14, the mold used in -the above molding device is to be described.

The object of developing the present molding device is to develop a device for molding of a molded product having fine uneven shape on the cavity face of the mold such as Fresnel lens as described above. For that purpose, working of five uneven shape should be possible on the cavity face of the mold, and also a mold with good heating operation according to the high frequency induction heating system is required.

The present inventors have investigated intensively in order to solve the above task, and consequently found that the above object can be accomplished in a mold for injection molding heated according to the high frequency induction heating system, by laminating an electroformed copper layer, and thereafter laminating a chromium plating layer or a titanium compound layer on the worked face.

More specifically, by use of an iron type metal material as the substrate for mold, heating can be done efficiently by high frequency heating, and the copper layer which is formed by electroforming is substantially free from effect such as pinhold, etc. and excellent in cutting workability, whereby high degree of mirror finishing is rendered possible. Further, by providing a nickel layer between the substrate of an iron type metal material and the copper layer according to the electroforming method, adhesive force between the iron type metal an the copper layer is enhanced to completely prevent peeling, etc. during mechanical working, hot impact.

Also, since the copper layer is susceptible to flaws caused by deforming on account of low surface hardness and elasticity, by lamination of a chromium plating layer or a titanium compound layer such as of titanium nitride, etc., it becomes possible to obtain a mold surface strongly resistant to flaw or deformation, while maintaining fine uneven portion or mirror surface characteristic.

The electroformed nickel layer may be laminated with a thickness of about 5 to 100 $\mu$m, and the copper layer should be preferably formed with a thickness of about 50 to 200 $\mu$m. When the nickel layer, copper layer are applied in this case, it is preferable to perform not annealing at 200° to 350° C., thereby relaxing the stress during film application.

The chromium plating layer laminated after cut working of copper layer should be preferably formed to a thickness of 1 to 20 $\mu$m. The titanium compound layer should be preferably laminated according to the vapor deposition method to a thickness of 0.1 to 3 $\mu$m.

As the titanium compound, those with extremely high hardness such as titanium nitride, titanium carbide, etc. can be used.

The present invention is described in detail below by referring to Examples.

MOLD EXAMPLE 1

Figure 7:
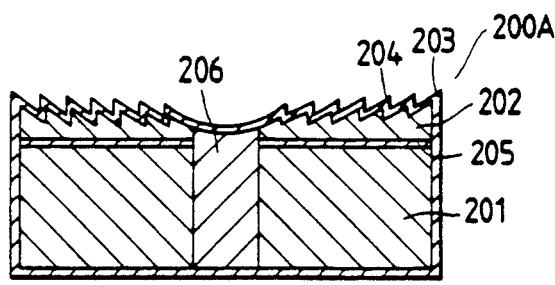
FIG. 7 is a sectional view of the mold showing an example of the present invention.
Figure 9:
FIGS. 9 to 13 are schematic sectional views showing an example of the preparation of the mold of the present invention.
Figure 8:
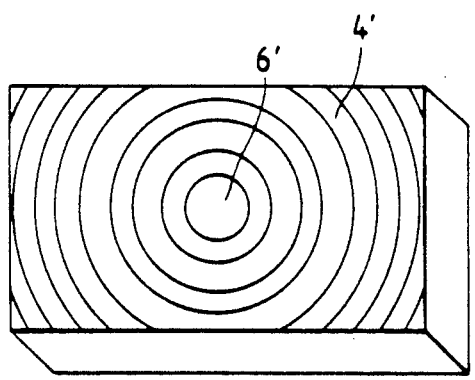
FIG. 8 is a perspective view.
Figure 10:
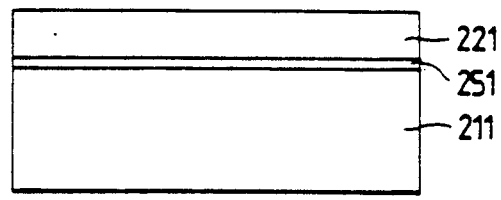

FIG. 7 shows a sectional view of the mold according to the present invention, Fig, 8 its plan view. As shown in FIG. 9, by use of SKD 61 steel material as the substrate 211, mechanical working is applied thereto by cutting, grinding, etc. Next, as shown in FIG. 10, according to the electroforming method, a nickel layer 20 $\mu$m is attached with a thickness of 20 $\mu$m on the substrate 211. Further, on the nickel layer 251 is attached a copper layer 221 according to the electroforming method with a thickness of 100 $\mu$m. Then, hot annealing is effected at 250° C.

Figure 11:
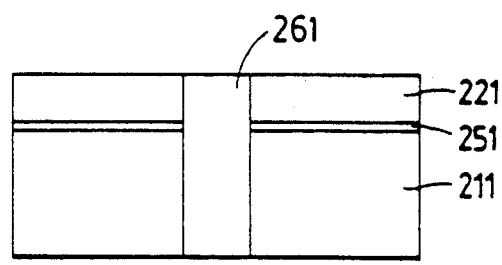

Next, as shown in FIG. 11, a mold comprising the three layers as described above is applied with outer diameter finishing, a hole for mirror surface lens is excavated at the center of the mold, and a dummy core 261 is inserted thereinto.

Figure 12:
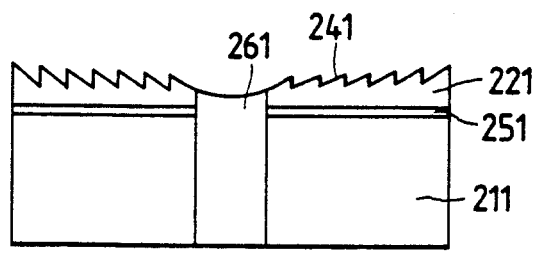

In the step shown in FIG. 12, the copper layer 221 is applied with mirror cutting working for Fresnel lens by use of a diamond bite. By applying at the same time cutting working on the dummy core, clearance can be improved with the mirror surface cored 262 is finally fitted.

Figure 13:
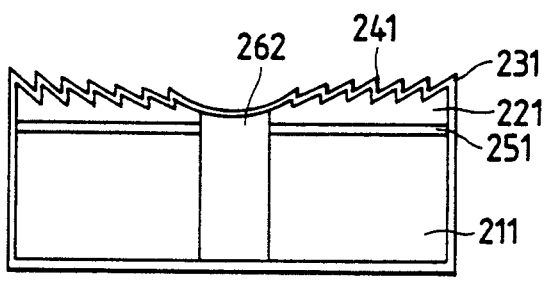

Next, as shown in FIG. 13, the dummy core 261 is removed, and the mirror surface core 262 is inserted, fitted, and chromium plating with a thickness of 1 $\mu$m is applied on the whole.

The mirror surface characteristic (surface roughness) of the mold thus obtained was found to be 0.01 $\mu$m, with the heating speed according to the high frequency induction system being 20° C./sec.

MOLD EXAMPLE 2

Figure 14:
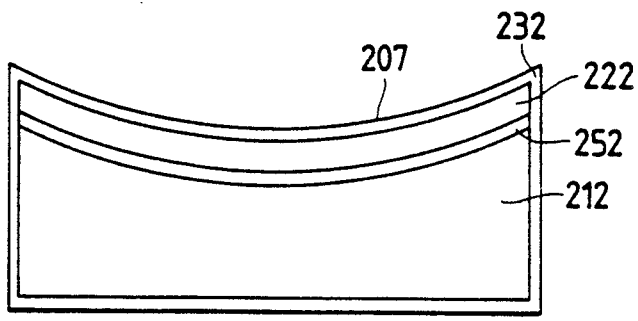
FIG. 14 is a sectional view of the mold according to another example of the present invention.

By use of S55C steel material as the substrate, nickel layer and copper layer are formed to 10 $\mu$m and 200 $\mu$m thicknesses, respectively, similarly as in Mold example 1. After mirror working is applied on this product as shown in FIG. 14, titanium nitride film is formed to 0.5 $\mu$m thickness by vacuum vapor deposition.

The mirror characteristic of the mold thus obtained is 0.01 $\mu$m, with the heating speed being 20° C./sec.

COMPARATIVE EXAMPLE 1

A mold was prepared by use of S45C (carbon steel). The mold exhibited a heating speed of 22° C./sec., but mirror working could not be applied.

COMPARATIVE EXAMPLE 2

By use of phosphorus bronze, a mold was prepared. When mirror working was applied in the same manner as in Examples, mirror characteristic of 0.01 $\mu$m was obtained, but the heating speed by the high frequency induction heating system was 3° C./sec., and sinking occurred when Fresnel lens was injection molded by use of this mold.

As described above, by laminating an electroformed nickel layer, and electroformed copper layer on an iron type metal substrate, applying cutting working and then laminating a chromium plating or titanium compound layer on its surface, it has become possible to provide a mold having excellent heating characteristics during high frequency induction heating, and also excellent mirror characteristic, mechanical and thermal strength.

Figure 15:
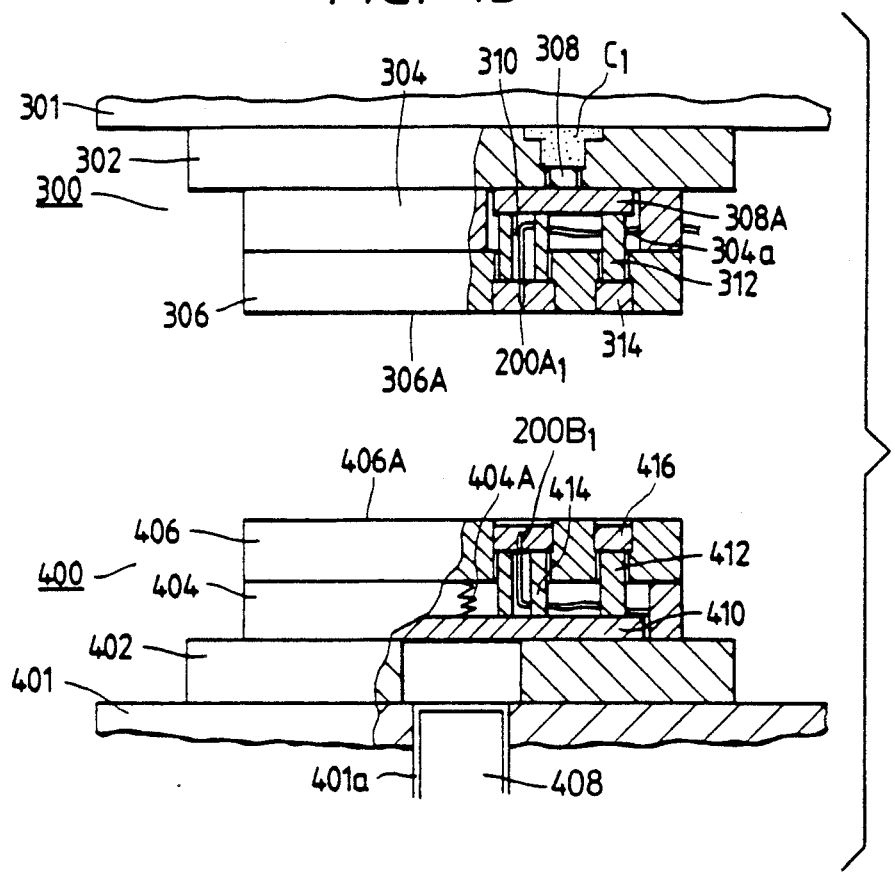
FIG. 15 illustrates a registration means of heating means.
Figure 16A:
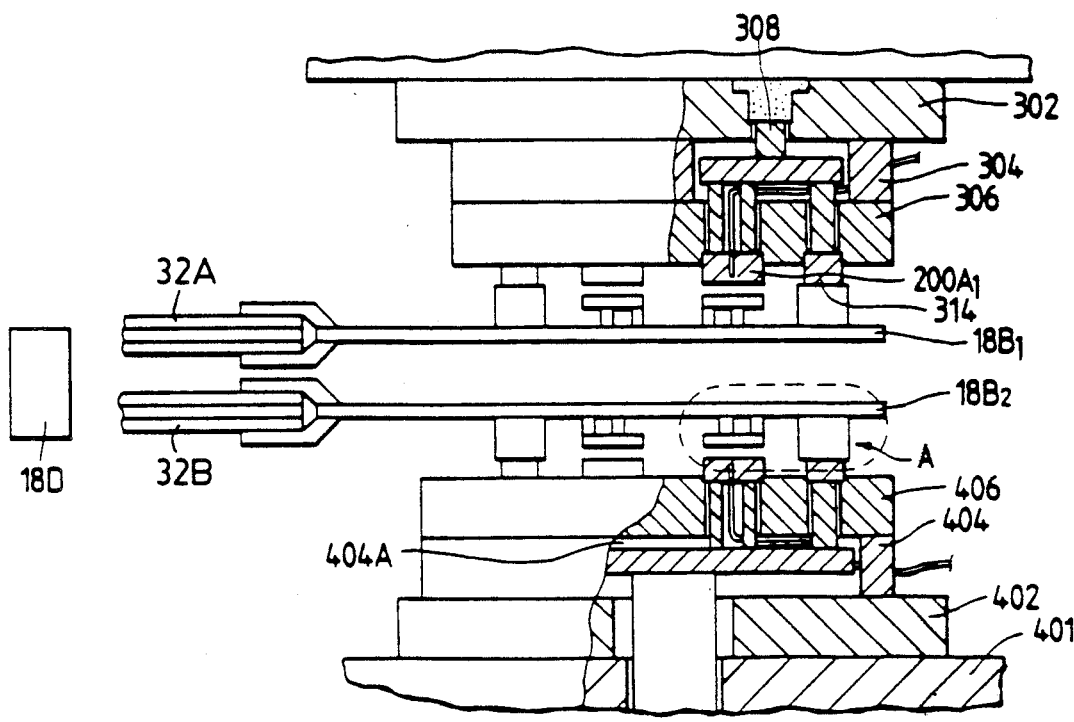
FIG. 16A illustrates actuation of the molding machine unit, heating means and registration means.

3) FIG. 15 and FIG. 16A illustrate in detail the molding device unit portion of the molding device shown in FIG. 1A.

In FIG. 15, the 300 side in the fixed side and the 400 side is the movable side. 301 is a fixing plate of the molding device unit, 302 a mounting plate, an the mounting plate 302 is provided a space for housing an air cylinder C$_1$. 304 is a midplate fixed on the mounting plate 302, and 306 is a mold plate on the fixed side mounted on the midplate.

The midplate 304 is provided with a bore 304a, and internally of the bore 304a are housed the cylinder rod 308 of the air cylinder C$_1$ and the moving plate 308a fixed on the cylinder rod 308 and having the first and second pins 310, 312 planted thereon. At the tip ends of the first and second pins 310 and 312 the cavity core 200A, and the stopper pin 314, are mounted respectively. 401 is the movable plate on the movable side of the molding machine unit, 402 the mounting plate, 404 the midplate mounted on the mounting plate 402, and 406 the mold plate on the movable side. 408 is the piston sliding through the thru-hole 401a of the movable plate on the fixed side, which is driven by a hydraulic cylinder (not shown). 410 is the moving plate fixed on the piston 408, and the moving plate moves through the mid plate 404 of hollow shape by the above hydraulic cylinder. The moving plate 410 has pins 412 and 414 planted thereon for supporting respectively the stopper pin 416 and the cavity core 200B on the movable side. The symbol 404A shows the spring member spanned between the mounting plate 402 and the moving plate 410. By the spring 404A, the cavity core $200B_1$ ($200B_2$) is given the urging force into the mold plate 406. FIG. 15 shows the state when the respective cavity cores 200A and 200B of the fixed side molding machine unit 300 and the movable side molding machine unit 400 are retreated to the innersides of the respective mold plates 306 and 406.

The cavity core 200A and the stopper pin 314 are constituted so as to be retreated onto the same plane as the parting face of the mold plate 306. The movable side cavity core 200B and the stopper pin 416 are retreated to the position recessed from the parting face 406A of the mold plate 406. The portion of the movable side cavity core 200B recessed from the parting face 406A becomes the cavity for molding for injection of a resin material.

FIG. 16A shows the state when the molding unit shown in FIG. 15 is mold opened, and the heating coil 18B (FIG. 1A) of the high frequency heating means is introduced.

Figure 17A:
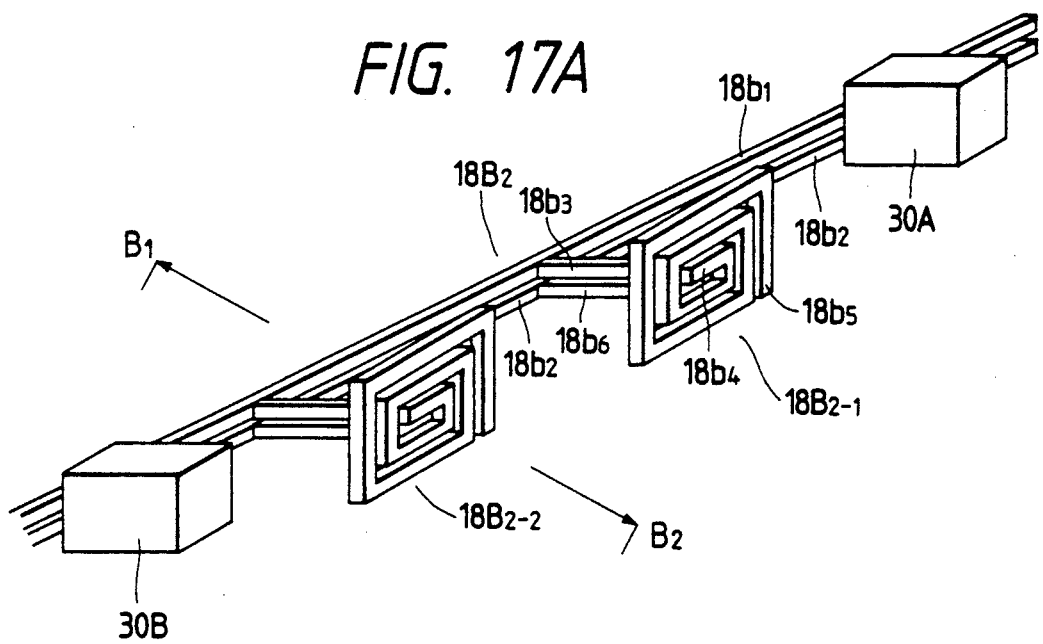
FIG. 17A is a perspective view of the coil heating of the heating means.

4) Before description of the operation of the molding unit, the heating coil is to be described on the basis of FIG. 17A, B.

In FIG. 16A, heating coils $18B_1$, $18B_2$ as the heating means are provided as one pair for heating the fixed side cavity core 200A and the movable side cavity core 200B. Also, in FIG. 16A, the molding units 300 and 400 shown have, in addition to the cavity cores $200A_1$-$200B_1$, another pair of cavity cores $200A_2$-$200B_2$ on the fixed side and the movable side for performing multiple simultaneous molding for molding of two molded product at the same time by one injection molding cycle. Accordingly, there are also provided one pair each of means for moving the cavity cores and stoppers shown in FIG. 15 (not shown).

FIG. 17A shows a perspective view of the portion A encircled with chain line in FIG. 16A. The hearing coil $18B_2$ forms linear electrode portions $18b_1$ and $18b_2$ made of electrolytic copper, the extended portion $18b_3$ extending toward the cavity core $200B_1$ from one of the electrode portions $18b_1$ and the would coil portion $18b_4$ shaped in spiral from the tip end of the extended portion $18b_3$, and is connected to the extended portion $18b_6$ extending from the outer peripheral end $18b_5$ of the would coil portion $18b_4$ to the other electrode portion $18b_2$.

30A and 30B are stopper bosses fixed on the electrode portions $18b_1$ and $18b_2$ (the stopper bosses are made of aluminum oxide), and as shown in FIG. 16, positioned outside of the heating coils $18B_{2-1}$, $18B_{2-2}$, to be fixed at the positions corresponding to the stopper pins 416 and 416A (stopper pins are made of carbon steel).

The electrode portions $18b_1$ and $18b_2$ are held at the ends by the electrode holding members 32A and 32B as shown in FIG. 16A. The holding members 32A and 32B are joined to the moving means 18D.

Figure 17B:
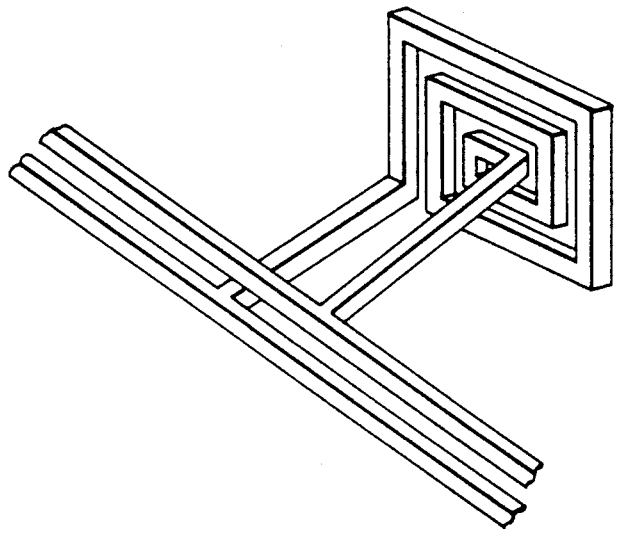
FIG. 17B is a perspective view in the $B_1$–$B_2$ direction in FIG. 17A.

FIG. 17B is a perspective view of the heating coil from the $B_1$-$B_2$ direction in FIG. 17A.

Next, the operations of the heating means and the molding machine unit are described in detail by referring to FIG. 15 to FIGS. 17A and 17B.

In the state in FIG. 15, under the mold opened state of the fixed side and the movable side, the respective cavity cores and the respective stopper pins are held in the respective mold plates 306 and 406. By stopping of the mold driving means shown in the flow chart in FIG. 1B, the heating means $18B_1$, $18B_2$ progress into a position between the respective mold plates 306 and 406 by the moving means 18D of the heating means. At the same time, the air cylinder $C_1$ and the hydraulic cylinder are actuated, whereby the respective moving plates 308A and 410 move through the respective midplates 304, 404 to protrude the stopper pins 314 and 416, and the cavity cores $200A_1$, $200A_2$, $200B_1$ and $200B_2$ through the respective supporting pins 310, 312, 412, and 414 from the parting face of the mold plates 306 and 406.

The air cylinder $C_1$ on the fixed side, the moving plate 308A, the pin 312, the stopper pin 314, and the hydraulic cylinder on the movable side, the moving plate 410, the pin 412 and the stopper pin 416 respectively constitute the registration means of the heating coils $18B_1$ and $18B_2$. That is, by the moving stroke amount of the air cylinder $C_1$, the amount protruded (distance) of the stopper pin 314 is determined. By this, the distance between the cavity core $200A_1$ and the coil would portion is determined to determine the amount of heat generated. The distances between the respective cavity cores and the respective coils are maintained at fixed relationships, then the cavity cores are heated through the heating coils $18B_{2-1}$, $18B_{2-2}$ by high frequency induction oscillation operations. When the temperatures of the respective cavity cores reach the above determined temperatures, oscillation is stopped based on the signals from the temperature sensors 20A and 20B, and the respective stopper pins are retreated into the respective mold plates 306 and 406 by actuations of the air cylinder $C_1$ and the above hydraulic cylinder.

Further, by means of the moving means 18D, the heating means is also retreated from between the molds. After retreating of the heating means, mold closing operation is performed, followed subsequently by mold closing, injection molding, cooling and take-out of molded product.

Figure 16B:
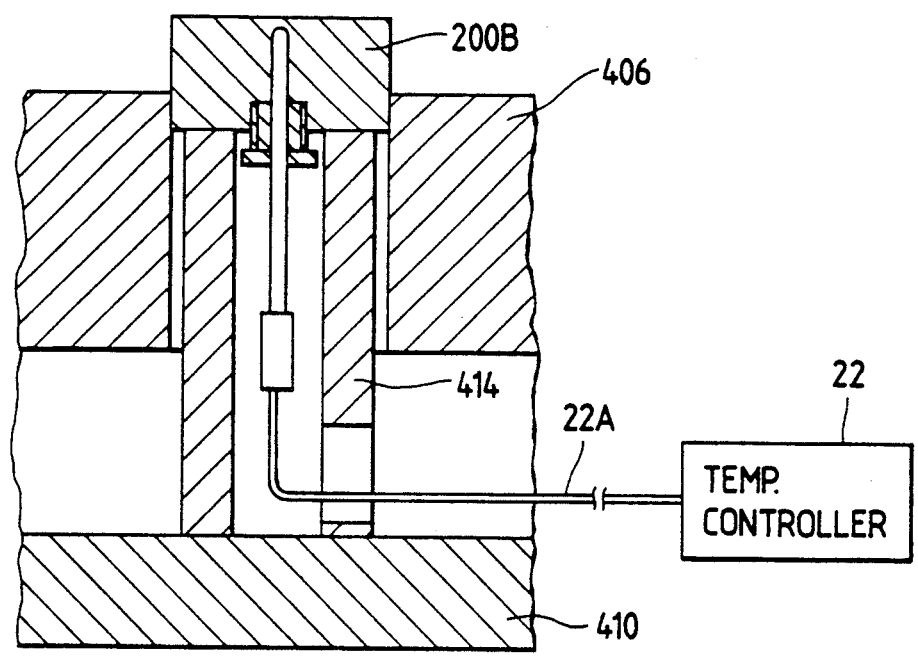
FIG. 16B illustrates the arrangement structure of the temperature measuring sensor.

FIG. 16B shows a partial sectional view showing the arrangement of the temperature measuring sensor of the molding unit according to the present invention shown in FIG. 15. In the Figure, the thermocouple 20A (20B) (corresponding to 20A or 20B shown in FIG. 1A) is inserted into the insert hole $200a$ formed in the cavity core $200A_1$. The thermocouple 20A is arranged at the position where the temperature of the cavity face of the cavity core $200A_1$ is measured. 20A-1 is a joining member such as a screw, etc. for fixing the thermocouple 20A to the cavity core 20A-1 in inserted into the hollow portion 310A which is made hollow, supporting the cavity core $200A_1$ on the moving plate 308A.

The other end of the thermocouple 20A is connected through the joining member 20A-2 to the lead wire 22A to be inputted in the temperature controlling means 22.

The lead wire 22A has a thru-hold 310B formed at a part of the side of the supporting pin 301 so as to tolerate the progress and retreatment movement from the mold plate 306A of the cavity core $200A_1$ accompanied with the movement of the moving plate 310.

The temperature measuring sensors shown in FIG. 16B are arranged similarly to the respective cavity cores $200A_1$ and $200A_2$, and the respective cavities $200B_1$ and $200B_2$ of the movable side mold.

The molding device with the constitution shown in FIG. 15 and FIG. 16A can perform heating operation most efficiently, because the distance between the cavity face and the heating means is determined accurately by the registration means of the heating means (air cylinders $C_1$ 308-314, and hydraulic cylinders 410-416) in a molding device of the system which heats the cavity face by heating means under the mold opened state.

Also, when the cavity cores $200A_1$, $200A_2$, $200B_1$ and $200B_2$ are changed depending on the size, shape of the molded product, the distance between the changed cavity core and the heating means can be controlled by controlling the amount of movement of the moving plates 308A and 410 by the cylinder. It can also be controlled by changing of the stopper pins 314 and 416.

Further, the registration means according to the present invention could be moved progressively and retroactively by association of the stopper pins and the cavity cores by mounting stopper pins 314 and 416 for registration and pins 310 and 414 for supporting the cavity cores $200A_1$ and $200B_1$ on the moving plates 308A and 410. The constitution of the present invention can maintain the registration of the relative position between the cavity core and the heating means at higher precision as compared with the constitution in which the cavity cores and the stopper pins are individually moved, whereby ease and accuracy of the hearing control of the cavity core may be enhanced.

Also, the coil used as the heating means according to the present invention has increased power concentration during application of high frequency by forming the coil in spiral shape, whereby the heating speed at the face to be heated becomes faster by about 1.5 to 2.0-fold. That is, since the magnetic flux density generated around the coil is increased in proportion to the winding number of coil, the magnetic flux density entering the fact to be heated becomes greater, resulting in increased eddy current density at the face to be heated, thus leading to increased heat generation.

5) Other examples of heating means:

According to the present invention, by making the shape of the heating coil for heating the mold members for forming a molded product a shape with the air gap between the coil and the mold member being partially enlarged at the bonding portion and the sliding portion on the face of the mold member in contact with the coil, the induction current density can be made smaller at the bonding portion and the sliding portion, whereby it becomes possible to prevent seize, discharging, dragging, etc. at those portions.

In the present invention, the mold member forming the molded product is a mold member which can be used for injection molding, compression molding, etc. of plastics, and its shape, size, etc. may be set as desired without any limitation. The material may be any one which can be heated by generation of induction current by high frequency. Ordinarily, the mold is constituted of a plurality of members comprising, for example, cavity core for forming the surface shape of molded product, supporting mold member, and base mold supporting the cavity core and the supporting mold member, and having cooling water pathway, and all of these are called comprehensively as mold. In the present invention, the mold member for forming molded product refers to the member which is required to be heated for forming molded product, meaning the cavity core in the above example. However, it is not necessarily a member having the face with which the molded product is in contact.

In the present invention, the face of the mold member facing the high frequency heating coil refers to the face arranged for heating the mold member before injection of a plastic material, etc. which directly receives the action of high frequency from the high frequency heating coil to generate induction current. Heating of the mold member is inclusive of the heating treatments in all the steps of heating the mold member with the high frequency heating coil, including not only heating of the member immediately before formation of molded product, but also the surface hardening treatment of the mold member.

In the present invention, the bonding portion and the sliding portion are inclusive of the bonding portion, sliding portion appearing on the face of the mold member facing the high frequency heating coil and the bonding portion, sliding portion with the portion of the mold other than the member in contact with the mold member. The sliding portion refers to the combined portion of the mold members, bonding portion with other portions of mold members. The sliding portion refers to the outer slide and inner diameter slide of the mold members, slide portion such as pin for thrusting molded product, etc., slide portion with other portions contacted during driving of mold members.

The air gap between the high frequency heating coil and the mold member refers to an average distance from a certain position of the face of the mold member in contact with the coil to the coil. In the present invention, the air gap is partially enlarged so that the gap is basically substantially constant and partially enlarged. Substantially constant means that the acting face of the high frequency heating coil and the mold member facing it are substantially similar in shape and arranged at approximately a constant interval. More specifically, if the air gap at the portion other than the mold members requiring no heating is defined as b, the gap of the mold members requiring heating as a, and the gap of the bonding portion or the sliding portion as c, the shape is designed so that the relationship of $a<c<b$ may be obtained.

Here, the air gap is represented by an average distance, but since the influence of the magnetic field by the high frequency received by a certain position of the mold member is an integral average of the magnetic field generated in the high frequency heating coil as a whole. As the average distance becomes greater, the magnetic influence received at the portion of the mold member becomes smaller, and therefore the induction coil becomes smaller. More specifically, when high frequency is applied to the high frequency heating coil (hereinafter called merely the coil), magnetic field following the primary current flowing through the coil is generated around the coil, whereby induction current is generated on the surface of the mold member by its magnetic field and the mold member gives rise to Joule's heat generation if $I^2R$ (I: current, R: resistance) through the induction current generated and the electrical resistance possessed by the mold member to elevate the surface temperature. At this time, the air gap (A) between the coil and the mold member surface and the induction current (I) generated at the mold gap (A) have the relationship of $I = k \times 1/A$ (k=coefficient determined by frequency, output of high frequency oscillator, mold member material characteristics), and therefore as the air gap between the coil and the mold member becomes larger, the mold member surface temperature tends to be elevated with difficulty. Hence, by making the air gap at the bonding portion and the sliding portion larger, the induction current generated can be made smaller, and consequently generation of discharging, seize, etc. can be prevented.

As to what extent the air gap should be set, since it depends on the above value of k, namely the frequency, of the high frequency oscillator, characteristics of the mold member material, the contact state of the bonding portion, the sliding portion, etc., it is suitably determined so that the desired heating treatment can be accomplished and also no phenomenon such as discharging, etc. may occur. Thus, be setting the air gap according to the desired heating treatment, it is possible to sufficiently elevate the necessary portions of the mold member itself and inhibit temperature elevation at the bonding portion and the sliding portion. Generally speaking, the air gap at the bonding portion and the sliding portion becomes larger as the wavelength of high frequency becomes smaller. The output is larger, the volume resistivity of the mold member material is larger, and the contact state at the bonding portion and the sliding portion is worse. The air gap may be made preferably relatively smaller.

Other constitutions for performing heat treatment of the mold member by use of the coil of the present invention may be based on the known techniques.

Referring now to embodiments, specific coil shapes are to be described.

Figure 18:
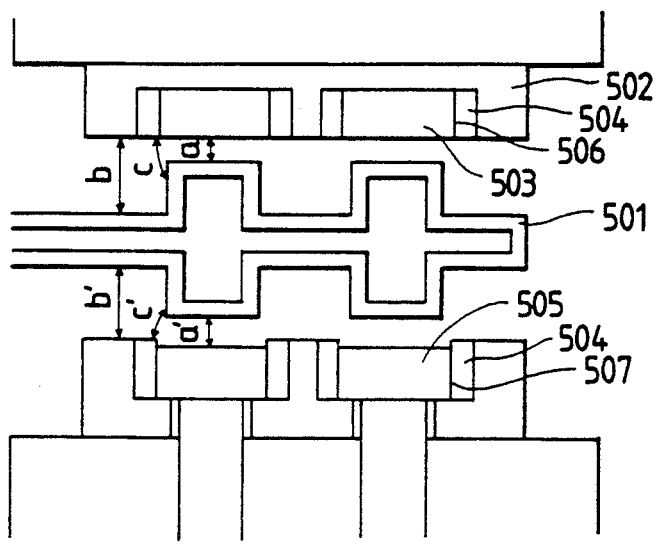
FIG. 18 to FIG. 22 show other examples of heating means.

FIG. 18 shows an embodiment of the present invention, 501 shows high frequency heating coil, 502 base mold, 503 shows cavity core (mold member) provided with a surface for forming a molded product, 504 supporting mold member for storing the cavity core in the mold, 505 cavity core which performs sliding with the supporting mold member, 506 combination face (bonding portion) between the cavity core and the supporting mold member and 507 sliding face (sliding portion) between the cavity core and the supporting mold member which performs sliding.

Figure 19A:
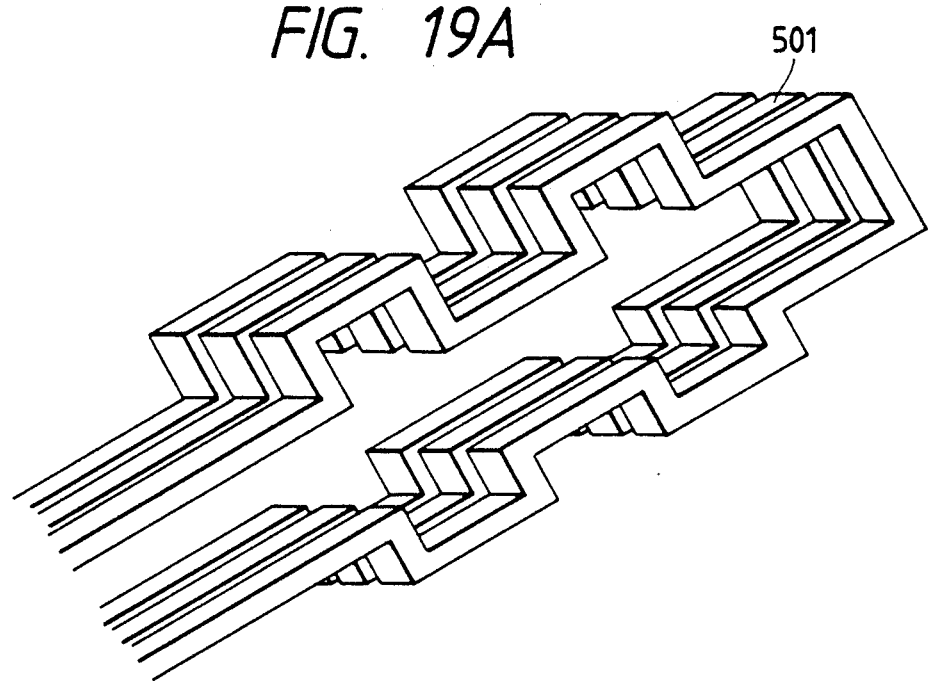
Figure 19B:
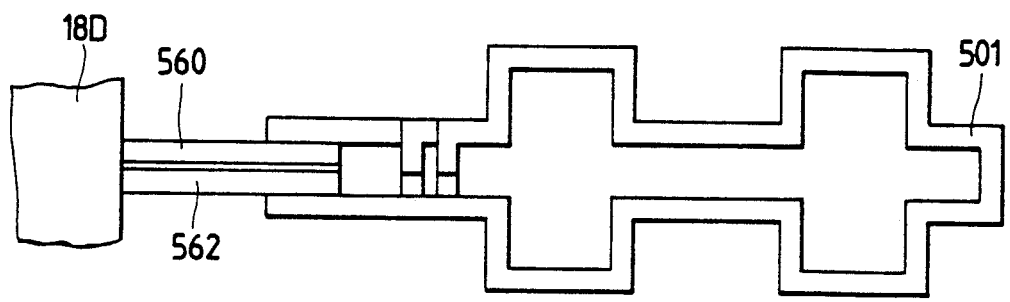

FIG. 19A is a perspective view of the high frequency heating coil 501 in FIG. 18. FIG. 19B shows the relationship between the coil 501 shown in FIG. 19A and the coil moving means 18D (FIG. 1A). The coil 501 is joined at the end through the electrode portions 560, 562 to the moving means 18D.

Figure 19C:
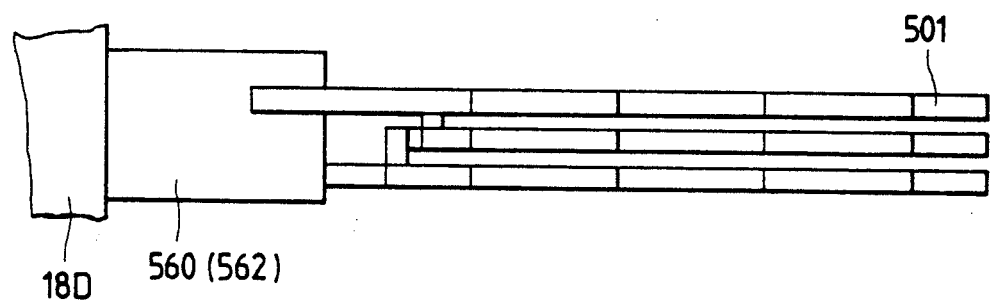

FIG. 19C is a view as seen from the side of FIG. 19B.

Here, the relationships between the air gaps a and a' between the action portion of the coil and the cavity core, the air gaps b and b' between other portions than the acting portion of the coil and the base mold, the air gaps c and c' between the coil and the bonding portion and the sliding portion are respectively a<c<b and a'<c'<b'. Thus, by enlarging the air gap from the coil with the mold combination portion 506 and the mold sliding surface 507, the induction current at the combination portion, the sliding portion can be made smaller during high frequency heating to prevent generation of discharging, seize, etc.

Figure 20:
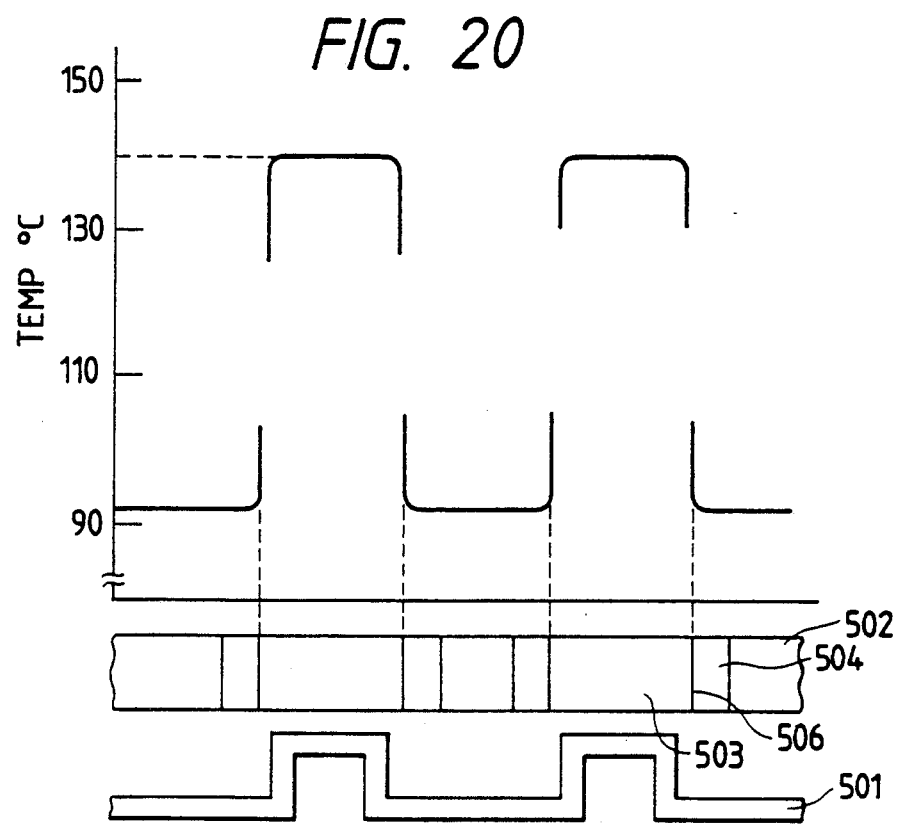

FIG. 20 shows the surface temperature of the mold member when heated with the device shown in FIG. 18. As shown in FIG. 20, by enlargement of the air gap between the coil and the mold member, although the temperature becomes lower at the combination portion (the induction current is smaller), the surface temperature of the mold member can be sufficiently elevated.

Figure 21:
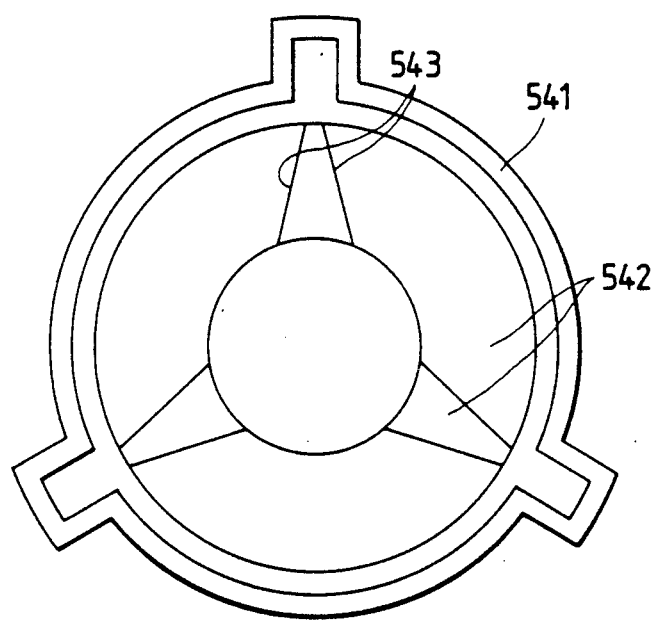

FIG. 21 is a schematic plan view showing another embodiment of the present invention. In FIG. 21, 541 is coil, 542 is mold member and 543 is mold combination portion (bonding portion).

Figure 22:
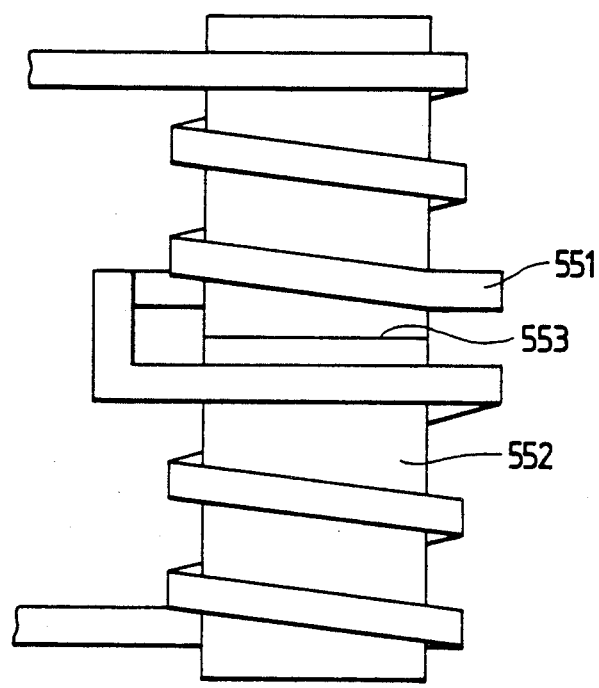

FIG. 22 is another embodiment of the present invention, showing a schematic side view when carrying out surface hardening of a cylindrical mold member. In FIG. 22, 551 is coil, 552 is mold member and 553 combination portion.

The surface temperature distribution of the mold member shown in FIG. 20 is obtained under the following conditions.

a=2 mm, b=30 mm, c=20 mm, high frequency 10 KHz, output 10 Kw, electrical resistance of cavity core 50 $\mu$ohm.cm.

As described above, by designing the shape of the coil so that the air gaps are enlarged at the bonding portion and the sliding portion of the mold member, seize, dragging during heating by high frequency of the mold can be prevented, and consequently, durability of the mold can be improved.

6) Other examples of mold used in the molding device are shown in FIG. 1.

The mold according to the present invention uses an iron metal type material as the base portion of the mold, and an electroless nickel-phosphorus layer is formed on the surface of the iron type metal base portion.

The present invention calls attention to the characteristics of the composition comprising a combination of nickel (Ni) and phosphorus (P), or nickel (Ni), phosphorus (P) and cobalt (Co), wherein heating is effected by high frequency induction through the magnetic characteristics possessed by nickel (Ni) and cobalt (Co) and the amorphous structure of the composition of nickel (Ni) and phosphorus (P), formed on the metal surface.

The composition of nickel (Ni) containing phosphorus (P) becomes amorphous and can be mirror finished on the mold surface by mirror cutting working, whereby the temperature of the surface layer portion of the cavity of mold can be elevated within a short time by high frequency induction heating through the magnetic characteristic possessed by nickel (Ni) or cobalt (Co).

FIG. 23 shows a mold consisting of an iron type metal layer 700 and a plating layer 710. As the iron type metal, S55C was used. FIG. 24 shows the preparation steps of the mold of the first example.

First, the surface of the iron type metal S55 is applied with shape working in cavity shape of the molded product (a). The surface roughness is worked to a precision Rmax of 1 $\mu$m or less. Then, an electroless nickel-phosphorous plating layer 710 is plated in a plating solution containing 11% by weight of phosphorus to a thickness of 100 $\mu$m on the cavity face of S55C (b). After plating the layer formation, heat treatment is effected at a temperature of 250° C. in an atmospheric thermostatic tank for 2 hours (c). After the heat treatment, angular grooves with depth of 50 $\mu$m are formed with a precise lathe by use of a diamond tool to form the cavity face. The precision of the surface roughness of the cavity face is maintained at 0.01 $\mu$m or less of Rmax (d).

The mold according to the first example as described above is mounted in the molding device shown in FIG. 1A as mentioned above and temperatures sensors are provided in the mold.

When oscillation operation of a high frequency output of 8.2 Kwatt and a frequency of 132 KHz is performed with the air gap between the heating coil of the high frequency induction heating means and the mold cavity face being set at 2 mm and the output of the sensors 20A and 20B as described above by the temperature controller 22, the surface temperature of the cavity surface is rapidly heated from 55° C. to 244° C. in 9.5 seconds. The heating speed of the mold in this example is 20° C. per second. Comparison of the mirror characteristic and heating speed between this example and prior art examples (1), (2) as shown in Table 2, demonstrates that the mold of this example is superior in both aspects.

Table 3 shows comparison of the mold of the first example containing 11% of phosphorus, as described above, and another comparative example. Comparative example contains 4% of phosphorus, and the mold material when subjected to the heat treatment at 250° C. for 2 hours has a limit of precision of surface roughness of 0.15 μm. Heating speed by high frequency heating is 21° C./sec. However, it is not suitable for mold material of the mold for which a high degree of surface roughness precision is demanded such as optical parts, etc.

Comparative example 2 shows the data of the mold material with a content of 11% phosphorous subjected to the heat treatment at 400° C. for 2 hours, and Comparative example 3 the data with a content of 14% subjected to the heat treatment at 250° C. for 2 hours.

As can be understood from the comparative data in Table 3, the mirror characteristic can be improved by increasing the content of phosphorus. On the other hand, although nickel itself has magnetic properties, its mirror characteristic is low, whereas the plating layer of nickel and phosphorous is amorphous in composition. It therefore has good mirror cuttability, and can also be magnetized by heat treatment, depending on the heat treatment conditions, and therefore high frequency heating can be conducted with good efficiency.

As the result of repeated various experiments and investigations, it has been determined that the mold material formed with a phosphorous content controlled within 8% to 13%, and treated at a heat treatment temperature between 200° to 350° C. for a heat treatment time between one hour and 3 hours gives a precision of the surface roughness of cutting working of the plating layer of 0.01 μm or less, and also a heating speed by high frequency induction heating means of 20° C./sec. or higher.

Table 1 shows the data when Fresnel lens is molded by use of the mold shown in the first Example as described above.

When the molded product is Fresnel lens, as described above, the molten resin injected into the cavity is required to be distributed to all the corners throughout the cavity forming the sharp angle portion of the lens without formation of void. For that purpose, it is necessary to promote the flow property of the resin by setting the mold temperature at high level. At the same time, the temperature curve shown in FIG. 2 is required to be maintained even after repeating the molding cycle for a number of times. The present invention gave satisfactory results according to the molding process as described above.

MOLD EXAMPLE 3

This example provides a mold material having a cobalt layer formed on an electroless plating layer. FIG. 25 is an illustration showing the constitution of the mold material. In the Figure, 700 is iron type metal, 720 electroless nickel-phosphorus plating layer and 730 cobalt deposition layer deposited on the above plating layer. By use of S55C as the iron type metal, in the same manner as in the above first Example 1, shape working is performed and electroless nickel-phosphorous plating layer 720 with a phosphorus content of 11% is formed to a thickness of 100 μm, followed by heat treatment at 250° C. for 2 hours. Then, after the angular grooves with depth of 50 μm were mirror worked, cobalt was deposited on the mirror worked surface to a thickness of 2 μm.

The mold prepared as described above was mounted on the device show in FIG. 1, and the mold was heated by actuation of the high frequency induction heating means at an output of 8.2 Kwatt, a frequency of 132 KHz, whereby the mold surface temperature was elevated from 55° C. to 245° C. in 8 seconds. The heating speed of the mold in this Example was 24° C./sec. The precision of surface roughness of the above cobalt deposition layer was 0.01 μm of Rmax.

For molding of Fresnel lens by use of the mold of the second Example as described above, molding was carried out under the conditions of Example 2 shown in Table 4 to obtain the results in the Table. As a result, the molding cycle was a cycle time of 58±2 sec.

As the result of confirmation experiment of this Example, the mold with a cobalt content within the range from 2% to 10% and a phosphorus content within the range from 4% to 10% and applied with heat treatment at a temperature of 200° C. to 350° C. for one hour to 3 hours ensured the data shown in Table 1, Example (2).

MOLD EXAMPLE 4

FIG. 26 illustrates the mold material structure of the mold according to the third Example. In the Figure, 700 is iron type metal S55C, 720 electroless nickel-phosphorous plating layer, 740 hard chromium plating layer. By use of iron type metal S55C, shape working was performed similarly as described above in the first Example, electroless nickel-phosphorus plating layer with a phosphorus content of 10% formed to a thickness of 100 μm, and heat treatment operation performed at a temperature of 200° C. for 2 hours, followed by formation of hard chromium plating layer 140 with a thickness of 3 μm on the above nickel-phosphorus plating layer.

The mold of the above third Example was mounted on the molding device shown in FIG. 1 for temperature tests of the mold, and temperature measurements were conducted by actuating the high frequency induction heating means under the conditions of an output of 10 Kwatt and a frequency of 132 KHz. As a result, temperature elevation from 55° C. to 198° C. in 8 seconds could be confirmed. The mirror characteristic of this mold was found to be surface roughness precision of Rmax 0.01 μm.

MOLD EXAMPLE 5

FIG. 27 shows the fifth Example. In the Figure, 800 is the base portion of mold comprising a copper alloy, 810 electroless nickel-phosphorus plating layer. The surface roughness precision of the copper alloy is finished to Rmax 2 μm. On the surface of the copper alloy is formed electroless nickel-phosphorus layer with a phosphorus content of 11% to 1 mm thickness and angular grooves with a depth of 50 μm are worked by mirror cutting. The roughness at this time was Rmax 0.01 μm. When the mold was mounted on the molding machine shown in FIG. 1 and the high frequency induction heating means was actuated at an output of 30 Kwatt and a frequency of 420 KHz, the mold surface was heated from 55° C. to 200° C. in 10 seconds.

The base portion of the mold of the above fourth Example is a nonmagnetic copper alloy which is not an iron type metal, and by forming an electroless nickel-phosphorus plating layer on the surface of the copper alloy, the plating layer is made amorphous to ensure the mirror characteristic of shape working of the mold surface and temperature elevation of the mold could be done by oscillation of a great output of 30 Kwatt, 420 KHz.

According to the present invention, by obtaining a mold material of mold also provided with both magnetic property possessed by iron type metal and mirror characteristic obtained by applying heat treatment on electroless nickel-phosphorus plating layer, a mold with great heating speed assuming high temperature in a short time by high frequency induction heating means could be obtained. According to the mold of the present invention, molding precision of optical parts, etc. could be improved by formation of a cavity having excellent surface roughness precision and fine uneven shape.

Also, heating to high temperature within a short time is made possible by the magnetic property of the iron type metal and the resistance value of the iron type metal during high frequency induction heating, whereby the molding cycle shown in FIG. 2 can be shortened to effect improvement of productivity.

TABLE 1

|  | Example 1 | Example 2 | Comparative (prior art) example |
| --- | --- | --- | --- |
| Molding material | Polycarbonate | Polymethyl methacrylate | Polymethyl methacrylate |
| High frequency output (KW) | 8.2 | 6.5 | 6.5 |
| Frequency (KHz) | 132 | 132 | 132 |
| Gap between coil and mold (mm) | 2.0 | 2.0 | 2.0 |
| Mold material | SKD61 | SKD61 | SKD61 |
| Oscillation time (sec.) | 10 ± 1 | 8 ± 1 | 8 |
| Mold controlled temperature (°C.) | 80 | 50 | — |
| Resin temperature (°C.) | 310 | 260 | 260 |
| Injection pressure (kgf/cm²) | 1600 | 1400 | 1400 |
| Injection speed (m/sec.) | 10 | 6 | 6 |
| Peak temperature (°C.) | 244 | 218 | 182~215 |
| Injection temperature (mold temperature) (°C.) | 160 | 135 | 110~142 |
| Mold opening temperature (mold temperature) (°C.) | 110 | 80 | 65~94 |
| Oscillation initiation temperature (°C.) | 95 ± 1 | 70 ± 1 | 53~81 |
| Molding cycle (sec.) | 55 ± 2 | 58 ± 2 | 75 |

TABLE 2

|  | Example (1) of Invention | Example (2) of Invention | Prior art example (1) | Prior art example (2) |
| --- | --- | --- | --- | --- |
| Mold construction | S55C + Electroless Ni-P plating | S55C + Electroless Ni-P plating | S45C (carbon steel) | Phosphorus bronze |
| Mirror surface characteristic (surface roughness) | 0.01 μm | 0.01 μm | Mirror surface impossible | 0.01 μm |
| High frequency heating speed | 20° C./sec | 24° C./sec | 22° C./sec | 3° C./sec |

TABLE 3

|  | Example(1) of Invention | Comparative example 1 | Comparative example 2 | Comparative example 3 |
| --- | --- | --- | --- | --- |
| Phosphorus content | 11% | 4% | 11% | 14% |
| Heat treatment temperature | 250° C.-2h | 250° C.-2h | 400° C.-2h | 250° C.-2h |
| Mirror surface characteristic (surface roughness) | 0.01 μm | 0.15 μm | 0.10 μm | 0.02 μm |
| High frequency heating speed | 20° C./sec | 21° C./sec | 16° C./sec | 8° C./sec |
| Magnetization | Magnetic | Magnetic | Magnetic | Non-magnetic |

I claim:

1. A molding apparatus having a cavity formed by a movable side mold, said molding apparatus being provided with a circulating pathway for circulating a cooling medium;
   an injection cylinder for injecting a resin into said cavity;
   a mold driving means for opening and closing said molding apparatus;
   a high frequency heating means having a coil member for heating said molding apparatus, an oscillation control section for heating said coil member and a progressing and retreating means for heating said cavity when said molding apparatus is open;
   a mold temperature detecting means including, a temperature sensor for measuring the temperature of said molding apparatus;
   a mold temperature control means including said cooling medium flowing through said circulating pathway provided within said molding apparatus;
   a means for stopping oscillation of said coil member when said molding apparatus reaches a predetermined temperature peak; and a cooling medium temperature control means for maintaining a constant temperature in said molding apparatus after said molding apparatus is closed.

2. A molding device comprising:
   a fixed side mold and a movable side mold, said molds together forming a cavity for molding a molded product;
   a high frequency heating means for heating said cavity formed by said fixed side mold and said movable side mold, said high frequency heating means having a heating coil and a means for progressing and retreating said heat coil to and from said cavity; and a moving means for controlling said coil at a predetermined preferred position between said fixed side mold and said movable side mold so that a constant temperature in said molding device is maintained after said cavity is formed.

3. A molding device according to claim 2, wherein said fixed side mold and said moveable side mold each have stopper pins and said high frequency heating means has stopper bosses, and the stopper pins and the stopper bosses are arranged so as to come into contact when said coil member is sandwiched between said fixed side mold and said movable side mold.

4. A molding device according to claim 3, having means for progressing and retreating the stopper bosses and stopper pins.

* * * * *

UNITED STATES PATENT AND TRADEMARK OFFICE
CERTIFICATE OF CORRECTION

PATENT NO. : 5,062,786

DATED : November 5, 1991

INVENTOR(S) : TAKASHI ARAI

It is certified that error appears in the above-identified patent and that said Letters Patent is hereby corrected as shown below:

On Title page,

IN [30] FOREIGN APPLICATION PRIORITY DATA

Insert: --Nov. 20, 1989 [JP] Japan ........ 1-135233 [U]
              Nov. 20, 1989 [JP] Japan ........ 1-135234 [U]
              Nov. 20, 1989 [JP] Japan ........ 1-135235 [U]--.

IN [56] REFERENCES CITED

After FOREIGN PATENT DOCUMENTS, insert:

-- OTHER PUBLICATIONS

McGraw-Hill, Dictionary of Scientific and Technical
      Terms, Third Edition, 1984, pp. 809 and 1019. --.

IN [57] ABSTRACT

Line 1, "device" should read --device having--.

COLUMN 3

Line 5, "phenomenons" should read --phenomena--.
   Line 50, "abovementioned" should read --above-mentioned--.

COLUMN 4

Line 3, "provided" should read --provide--.
   Line 4, "cut worked" should read --cut-worked--.
   Line 61, "means," should read --means.--.

UNITED STATES PATENT AND TRADEMARK OFFICE
CERTIFICATE OF CORRECTION

PATENT NO. : 5,062,786
DATED : November 5, 1991
INVENTOR(S) : TAKASHI ARAI

Page 2 of 4

It is certified that error appears in the above-identified patent and that said Letters Patent is hereby corrected as shown below:

COLUMN 6

Line 18, "preferably" should read --preferable--.

COLUMN 7

Line 3, "to" should read --$t_c$--.
Line 4, "injection $t_c$" should read --injection temperature $t_c$--.

COLUMN 8

Line 23, "according" should read --according to--.

COLUMN 9

Line 20, "an" should read --and--.
Line 34, "nickel layer," should read --nickel layer and--.
Line 38, "cut" should read --cut- --.
Line 67, "cutting working" should read --cutting-working--.

COLUMN 10

Line 1, "cutting working" should read --cutting-working--.
Line 49, "an" should read --and--.

COLUMN 11

Line 44, "hearing" should read --heating--.
Line 48, "would" should read --wound--.
Line 52, "would" should read --wound--.
Line 59, "416A" should read --314--.

UNITED STATES PATENT AND TRADEMARK OFFICE
CERTIFICATE OF CORRECTION

PATENT NO. : 5,062,786
DATED : November 5, 1991
INVENTOR(S) : TAKASHI ARAI

It is certified that error appears in the above-identified patent and that said Letters Patent is hereby corrected as shown below:

COLUMN 12

Line 26, "would" should read --wound--.
Line 54, "in" should read --is--.

COLUMN 15

Line 14, "be" should read --by--.

COLUMN 16

Line 38, "cutting working" should read --cutting-working--.

COLUMN 17

Line 43, "cutting working" should read --cutting-working--.

COLUMN 18

Line 12, "show" should read --shown--.

COLUMN 20

Line 59, "of" should be deleted.

UNITED STATES PATENT AND TRADEMARK OFFICE
CERTIFICATE OF CORRECTION

PATENT NO. : 5,062,786
DATED : November 5, 1991
INVENTOR(S) : TAKASHI ARAI

It is certified that error appears in the above-identified patent and that said Letters Patent is hereby corrected as shown below:

COLUMN 21

Line 2, "heat coil" should read --heating coil--.

Signed and Sealed this

Thirteenth Day of July, 1993

Attest:

MICHAEL K. KIRK

Attesting Officer  Acting Commissioner of Patents and Trademarks